United States Patent
Novak et al.

(10) Patent No.: US 7,209,633 B1
(45) Date of Patent: *Apr. 24, 2007

(54) SYSTEM AND METHODS FOR LOGICAL MEMORY DEVICES IN A DIGITAL MEDIA PLAYER

(75) Inventors: Robert E. Novak, Santa Clara, CA (US); Michael E. Sears, Los Altos, CA (US)

(73) Assignee: Melodeo, Inc., Seattle, WA (US)

( * ) Notice: Subject to any disclaimer, the term of this patent is extended or adjusted under 35 U.S.C. 154(b) by 1033 days.

This patent is subject to a terminal disclaimer.

(21) Appl. No.: 10/349,203

(22) Filed: Jan. 22, 2003

Related U.S. Application Data (60) Provisional application No. 60/355,167, filed on Feb. 7, 2002, provisional application No. 60/350,905, filed on Jan. 23, 2002.

(51) Int. Cl.
*H04N 5/76* (2006.01)
*H04N 7/00* (2006.01)
*H04N 5/00* (2006.01)

(52) U.S. Cl. ........................ 386/46; 386/125
(58) Field of Classification Search ................ 386/46, 386/125
See application file for complete search history.

(56) References Cited

U.S. PATENT DOCUMENTS 7,016,418 B2 *  3/2006  Wang et al. ............ 375/240.24
7,120,734 B2 * 10/2006  Ogino ........................ 711/111
7,126,770 B1 * 10/2006  Arai et al. ..................... 360/8

OTHER PUBLICATIONS

Open-source audio wins MP3 player support, c/net NEWS.COM, Feb. 24, 2003, pp. 1-2. Retrieved from the internet: <URL:http//www.CNETnews.com.html>.

Wired News: A TiVo Player for the Radio, May 12, 2003, pp. 1-3. Retrieved from the internet: <URL:http//www.wired.com/news/print/0.1282.587.69.00.html.

* cited by examiner

*Primary Examiner*—Thai Q. Tran
*Assistant Examiner*—Nigar Chowdhury
(74) *Attorney, Agent, or Firm*—Black Lowe & Graham PLLC (57) ABSTRACT

This disclosure deals with the management of data in the memory of a digital media playback device. Specifically this dislcosure deals with the mechanisms to allow memory to be treated as a partitioned resource, regardless of the physical implementation of the data storage in the playback device. Manage the memory on a digital media player as logical partitions, not just physical partitions between different types of memory. This will treat the entire memory space as a uniform piece of memory, regardless of whether the memory is internal memory with battery backup, Flash memory that behaves like a logical disk, rotating media that is read/write (typically magnetic disk or CD-RW or DVD-RW) or rotating media that is read only. Overlaid on this uniform memory model is a partitioned memory model that divides the memory into logical devices that are used to constrain the size of the memory used for various (logical) types of digital media.

3 Claims, 7 Drawing Sheets

| Group to Category | News | Entertainment | Weather | Traffic | Sports | $ - Financial |
|---|---|---|---|---|---|---|
| 1 | 60% | 0% | 5% | 10% | 10% | 15% |
| 2 | 40% | 0% | 20% | 5% | 5% | 30% |
| 3 | 70% | 0% | 0% | 0% | 0% | 30% |
| 4 | 0% | 50% | 10% | 10% | 10% | 20% |
| 5 | 60% | 30% | 0% | 0% | 5% | 5% |
| 6 | 0% | 40% | 0% | 0% | 0% | 60% |
| 7 | 18% | 18% | 9% | 9% | 18% | 18% |
| 8 | 25% | 25% | 0% | 0% | 25% | 25% |

| Group | Type | Location | Installation | Persistence | Class |
|---|---|---|---|---|---|
| 1 | R/W | Local | WIRED | Ephemeral | RAM |
| 2 | R/O | Local | WIRED | Permanent | ROM |
| 3 | R/W | Local | WIRED | Semi | FLASH |
| 4 | R/W | Local | Slot | Semi | FLASH |
| 5 | R/O | Local | Disc | Semi | CD-ROM |
| 6 | R/W | Local | Disc | Volatile | Magnetic Disk |
| 7 | R/W | Network | Network | Volatile | Magnetic Disk |
| 8 | R/O | Network | Network | Semi | Web Server |

| Group to Category | News | Entertainment | Weather | Traffic | Sports | $ - Financial |
|---|---|---|---|---|---|---|
| 1 | 60% | 0% | 5% | 10% | 10% | 15% |
| 2 | 40% | 0% | 20% | 5% | 5% | 30% |
| 3 | 70% | 0% | 0% | 0% | 0% | 30% |
| 4 | 0% | 50% | 10% | 10% | 10% | 20% |
| 5 | 60% | 30% | 0% | 0% | 5% | 5% |
| 6 | 0% | 40% | 0% | 0% | 0% | 60% |
| 7 | 18% | 18% | 9% | 9% | 18% | 18% |
| 8 | 25% | 25% | 0% | 0% | 25% | 25% |

Figure 7

SYSTEM AND METHODS FOR LOGICAL MEMORY DEVICES IN A DIGITAL MEDIA PLAYER

RELATED APPLICATIONS

The present application claims the benefit of U.S. Provisional Application No. 60/355,167, entitled "System and Methods for Logical Memory Devices in a Digital Media Player," filed Feb. 7, 2002, with inventors Robert E. Novak and Michael E. Sears, which is hereby incorporated by reference in its entirety for all purposes. The present application also claims the benefit of U.S. Provisional Application No. 60/350,905, entitled "Uniform Memory Management for Personal Devices with non-Uniform Memory Systems," filed Jan. 23, 2002, with inventors Robert E. Novak and Michael E. Sears, which is hereby incorporated by reference in its entirety for all purposes.

TECHNICAL FIELD

This disclosure relates generally to electronics and communications, and more particularly to interactive radio and digital media playback systems.

BACKGROUND

A digital media playback device typically includes a handheld device such as an MP3 player. Some MP3 players are implemented as software programs on Personal Computers. Handheld MP3 players have limited memory sizes that can consist of Flash Memory, dynamic RAM memory and rotating CD-ROM memory. However, these types of MP3 players have required that the user/consumer must manage the memory content (also known as playlists) on the MP3 Player.

This manual management of the memory content has restricted the use of these devices only to users/consumers that are computer literate and are able to manage the storage on the various types of memory in the MP3 device. For example in typical MP3 player there may be 'internal memory' that is built-in to the device when it is manufactured and Flash Memory (sometimes in the form of Smart Media cards) which is inserted into the device by the user/consumer after a separate purchase. The user/consumer must be cognizant of the various types of memory in the device and the limitations of the capacity of the devices. In addition, the digital media players were envisioned to only handle the playback of music files. However, there are many more types of digital media than music. For example, there is spoken audio that falls in the categories of News, Weather, Sports, Traffic and Entertainment. Thus, it would be desirable to automatically manage all of the memory space for the electronic media files for the consumer/user. Furthermore, it would be desirable to automatically partition the disparate memories into logical sub-devices that handle different categories of digital media.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE BACKGROUND ART

Generally in a system that supports the recording, conversion and downloading of audio information from the radio, the radio content is produced in a studio. The studio sends the audio tape of the broadcast information to a post production house where commercials are inserted and the audio tape is edited for timing to fit within production time slots. Certain commercial time slots are filled with generic or filler commercials, but are specially tagged by audio tones so that a local radio station can insert their local commercials in place of these generic commercials. The final production content is often distributed by a variety of mechanisms. For older stations, the content is sent to them on audio tape for playback. For newer stations, the content is transmitted over special leased lines or satellite links to the receiving radio station, which will either record the content from the incoming signal for delayed playback, or play the content synchronously with the transmission.

The local station can provide editing in house to insert its own local commercials in place of the specially marked generic commercials. The local station may have its own local studio for production of programs, some of which may be transmitted live as the programs are being made. This is typical of News programs and 'live' disk jockey (DJ) shows that are often transmitted during viewer/listener commuting times.

In a system for recording radio programs and storing them in an MP3 player, the following steps occur. The consumer/user may select programs that they desire to hear from a program guide that is provided to the consumer in a variety of methods.

The guide data can be presented to the consumer/user in a variety of ways. It can be presented by a web based HTML/XML application that uses a browser to display the guide data. The data can also be presented by an application running on the consumer/user computer.

The data can be transmitted to the consumer/user computer by a variety of methods. It can be sent over a network (such as the Internet) or it can be distributed to the consumer via some form of magnetic or optical storage (magnetic disk, e.g., floppy disk or optical disk, e.g. CD-ROM) device. Other methods of data transfer are possible.

The consumer/user then makes choices about which programs they want to hear. The listing of programs can contain data which includes (but is not limited to):

1. Program Information
Name of Recording (e.g., Morning Edition)
Recording Genre
Band Selection for Recording (AM, FM, TV)
Side Band (Upper, Lower)<-advanced feature not available in all radios
Frequency in Hertz
2. Schedule of Program
Start Date
End Date
Days of week (S,M,T,W,T,F,S)
Time of Day (24 hr format)
Duration of the program (in minutes and seconds)
Repeat (daily—no days selected, weekly—repeat every week on selected days, bi-weekly, monthly, bimonthly, annually).

An application on the consumer/user computer then can use task-scheduling software in the operating system or use its own task scheduling daemon process to start a recording task just prior to the time of the broadcast. The recording application will then use a unique algorithm to insure that the recording of the broadcast can be associated with the program database. This can be done in several ways.

The filename of the recording can be encoded to contain the information about the recorded program. Alternative implementations are possible. In one embodiment a data structure is added into the recording file that has a header block (written before the recording data) that contains all of the information about the recorded program. In another embodiment a file with an identical name to the recorded data file, but a different file type can be paired with the recording file to hold the information about the recording. Other techniques are possible.

The recording application can usually store the data in one of two formats (additional formats are possible). The first format is WAV format. A WAV format is a digitized analog format. The second format is called MP3 (MPEG Layer 3) which is a digital format that includes (inaudible) compression with loss of signal data.

In one embodiment, once the recording has been completed then a task to transform the WAV style file into a compressed digital format such as MP3 is begun. Other embodiments may include direct recording into MP3 format with only a slight buffering delay to accumulate enough audio to perform compression.

After the file has been converted into a compressed digital format suitable for playback in a digital media player device (e.g., MP3 Player), then the sound file along with track title information is transferred to the MP3 player.

Figure 1:
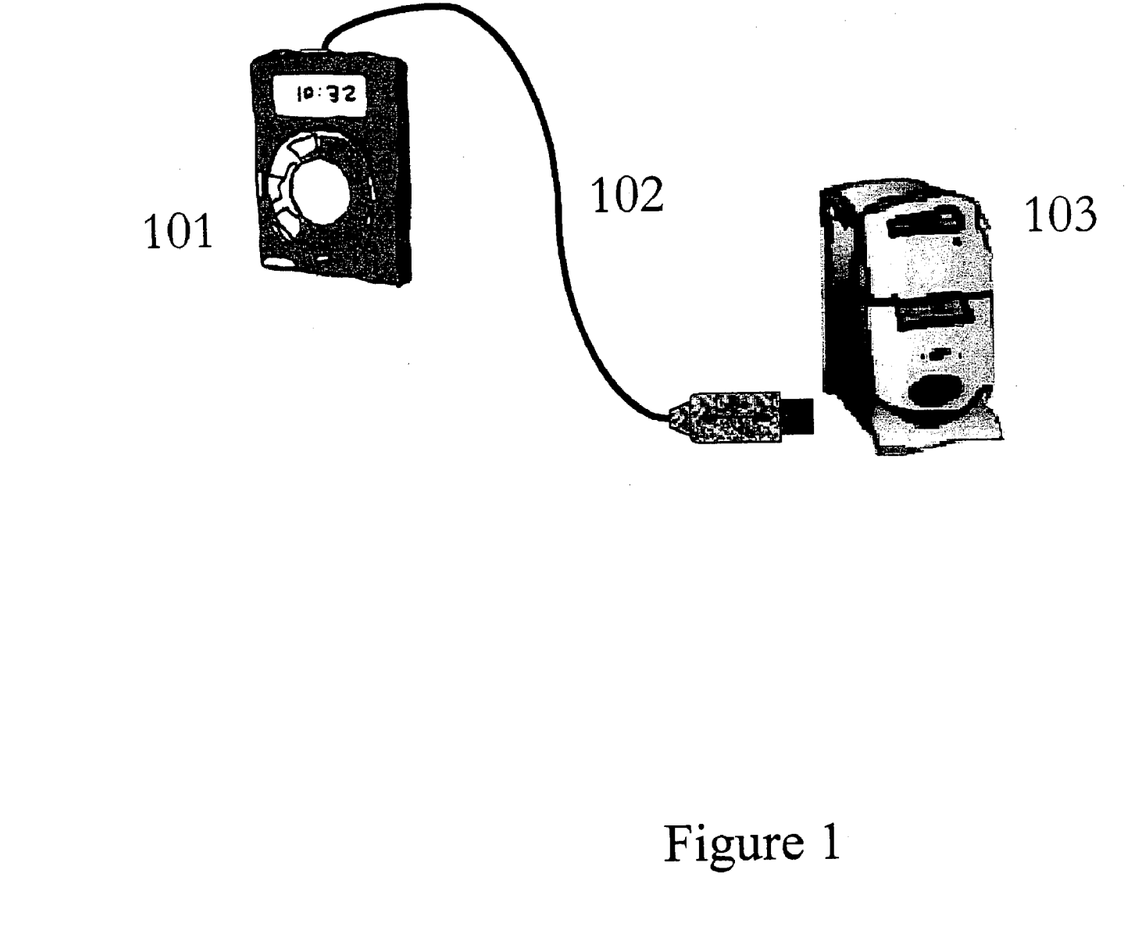
FIG. 1 is a diagram of an MP3 device connected to a personal computer according to one embodiment of the invention.

Referring now to FIG. 1 there is shown an embodiment of the invention with a digital media playback device 101, illustrated here as an MP3 Player although other digital media playback devices such as DVD players are possible. The device 101 is connected to a computer 103, representative of any computing device with a processor and storage and possibly a network connection. The connection between the device 101 and the computer 103 is made with a communicative coupling 102. The communicative coupling 102 is shown as a USB Connection Cable but other couplings are possible, such as 1394—aka Firewire, Parallel Port, Serial Port, IRdA or RF communications. Through this coupling two-way communications take place between the computer 103 and the digital media playback device 101.

In North America, the Amplitude Modulation (AM) band is 535 kilohertz to 1.7 megahertz in the Radio Frequency (RF) spectrum. The Frequency Modulation (FM) band for North America spans 88 megahertz to 108 megahertz in the RF spectrum. Although this description is specifically about the production, broadcast and recording of radio signals in the broadcast frequencies, there is no reason to limit this description to these segments of the RF spectrum. All of the above descriptions apply to any set of frequencies where signals have been encoded in a variety of audio, video, teletext, telefax and/or Morse code or other encoding. This includes spread spectrum and frequency agile encoding.

Figure 2:
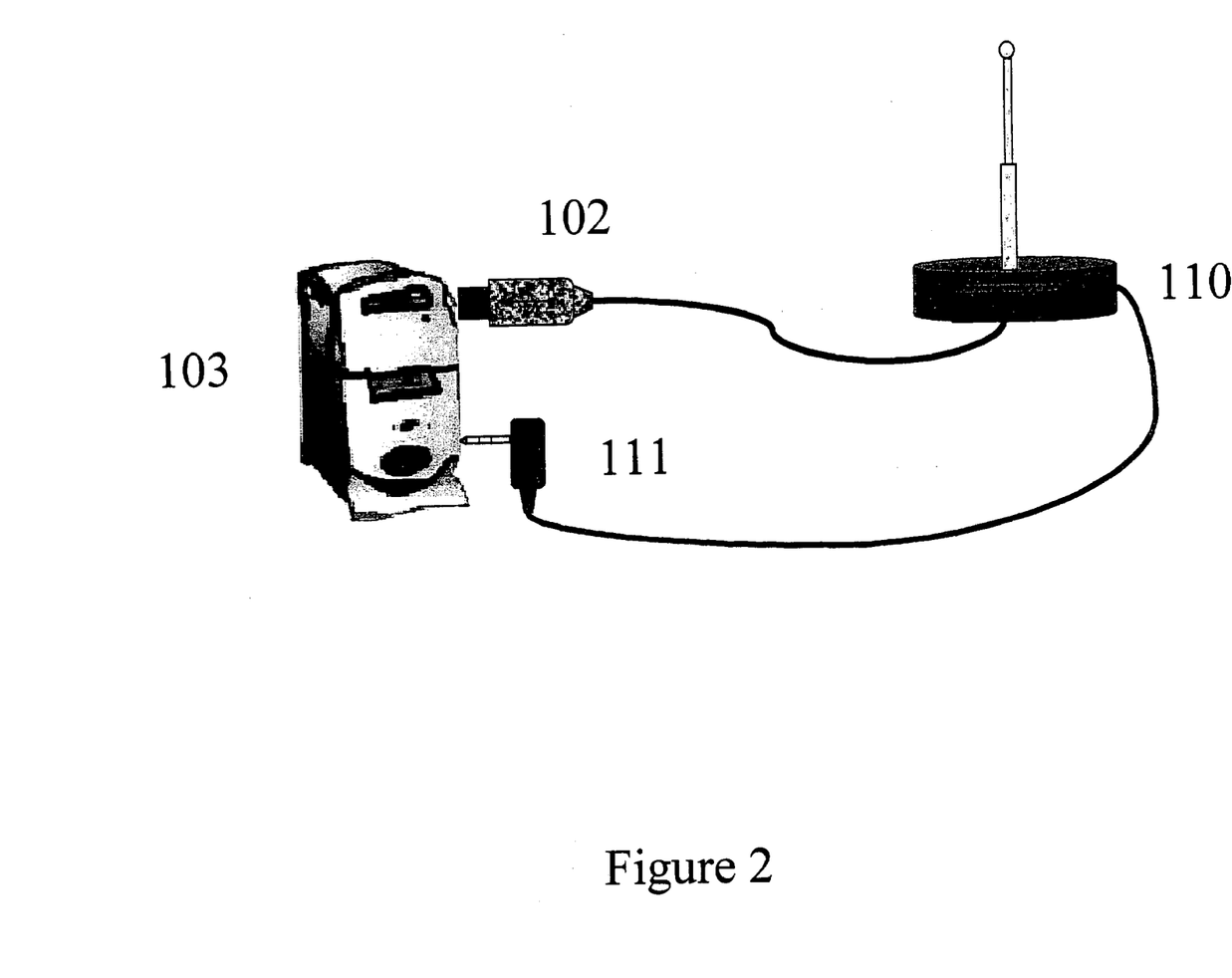
FIG. 2 is a diagram that illustrates a computer controlling the tuning and recording of a radio by a computer.

Referring now to FIG. 2 there is shown an embodiment of the invention with a radio receiver 110. In this illustration the radio receiver 110 is communicatively coupled to a computer 103 with two different communication paths. The first communicative coupling 102 is shown as a USB Connection Cable, but other couplings are possible. The second coupling 111 carries analog audio data and is coupled to the computer 103 with a 2.5 mm stereo plug that connects to either a microphone or a line-in port on the computer 103. When the computer receives the analog signal it converts the signal to a digital format known as WAV by sampling the amplitude of the analog signal many times each second.

SUMMARY OF THE INVENTION

This invention deals with the management of data in the memory of a digital media playback device. Specifically this invention deals with taking a uniform allocation of data storage and breaking it up into logical partitions that have functional associations with different types of content. The advantage of this type of storage management is that different amounts of storage are dedicated to specific tasks in the device. This will facilitate not only the process of pushing content into the device in a managed way, but also managing the playback of the content in a way that keeps the playback process fresh for the consumer.

DETAILED DESCRIPTION OF THE PREFERRED EMBODIMENTS

Embodiments of an apparatus and/or method for providing automated management of the memory in a digital media playback device are disclosed herein. As an overview, an embodiment of the invention provides an apparatus and method that permit automated management of the various memory types as if they were a uniform memory that is seamless and contiguous.

Figure 3:
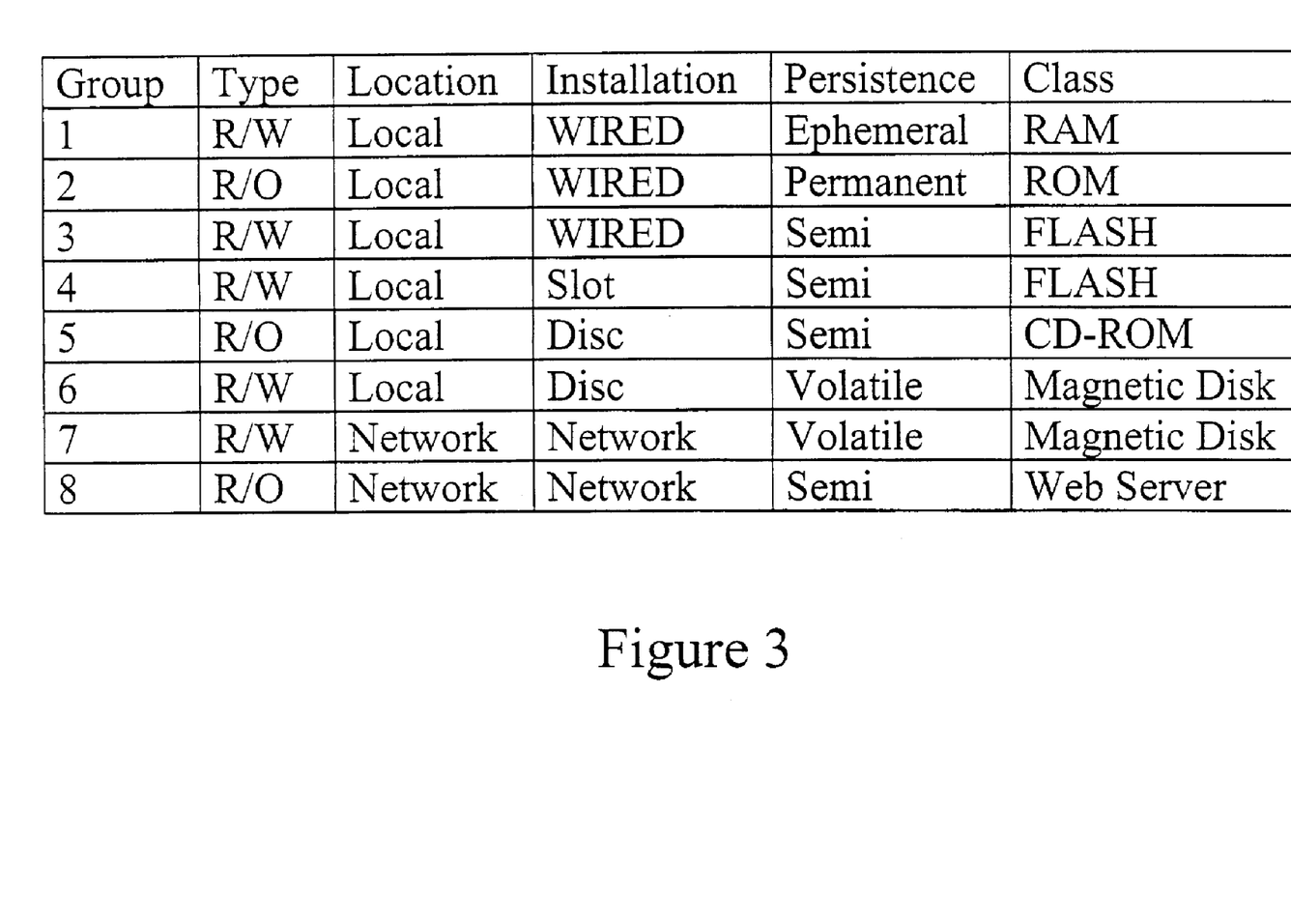
FIG. 3 is a table that describes the types of memory typically communicatively coupled with digital media playback devices according to an embodiment of the invention.

Referring now to FIG. 3, it illustrates a table of the types of logical memory that may exist for a portable digital media playback device. Other types of memory are possible, but this list of memory types will be used to illustrate the additional embodiments of this invention.

A playlist is a list of audio tracks (or other digital media) that is grouped together into a logical collection. A Music Compact Disk is an instantiation of a playlist that represents the music publisher's organization of the artist(s) music. As previously mentioned in FIG. 1, it illustrates one embodiment where an MP3 player 101 is communicatively coupled with a computer 103. Note that in other embodiments that the computer can represent any computing device with memory, storage and/or a network connection. In such an embodiment a user/consumer designates a playlist of the MP3 audio tracks (or other digital media) that are to be placed on the MP3 player. The computer 103 places all of the audio tracks on the MP3 player. When placing the tracks, it does so without regard to the types of memory within the MP3 player. The user/consumer is not concerned with the different types of memory.

Figure 4:
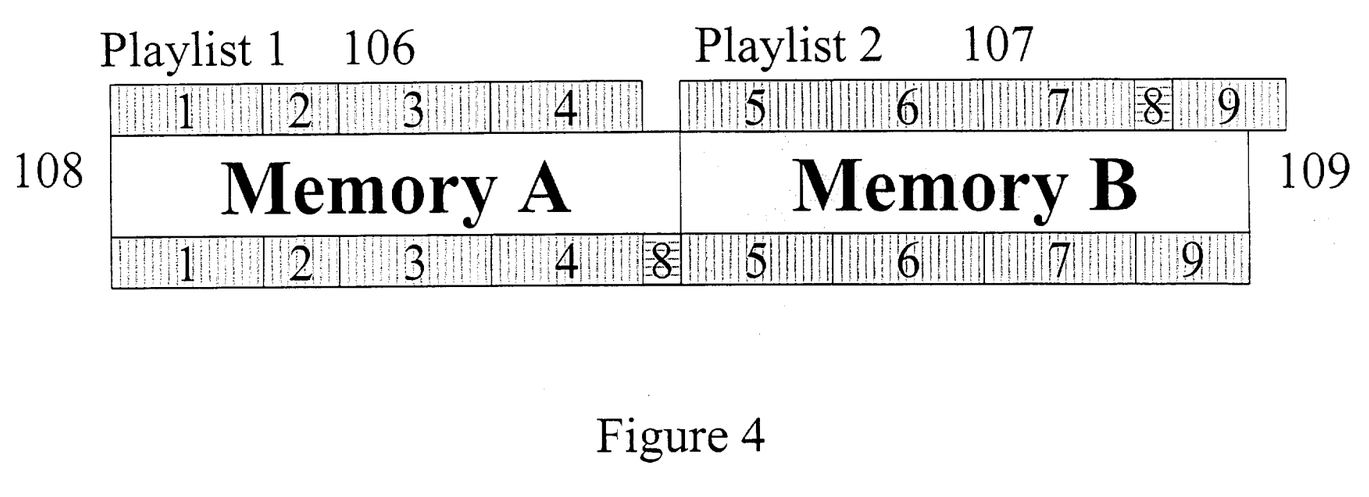
FIG. 4 is a diagram that shows that two consumer/user playlists are re-arranged in their storage order (which does not necessarily represent their playback order) in order to optimize the utilization of memory in a digital media playback device.

Referring now to FIG. 4, in one embodiment, the user/consumer can select several different playlists that are to be loaded into the digital media player. In this FIG. 4, Playlist 1 is labeled 106 and Playlist 2 is labeled 107. Each playlist is treated as a sequential list and all of the audio tracks represented by all of the playlist information are loaded into the memory of the digital media playback device (aka digital media player). As this figure shows, all of 106 will fit in Memory A 108, but not all of 107 will fit in Memory B 109. By reorganizing the physical layout of the tracks and moving track 8 from 107 into Memory A (108), both playlists can fit into the available memory. By performing this operation in an invisible manner, the consumer experience is not affected. In order to perform this operation in an invisible manner, the digital media playback device must maintain a table in memory which provides a mapping of the original requested order of the media tracks to the physical ordering of the digital media in memory. With this mapping the consumer experience is preserved, but the allocation of memory is minimized.

In another embodiment, the user/consumer can select several different playlists that are to be loaded in the digital media player. If the total storage required to hold all of the electronic media is inadequate, there are several choices that can be made for the user/consumer in an automated fashion by the application, depending on hints or heuristics that are provided by the user/consumer in the product option selections.

The selections can be organized first by user selected preference criteria to choose the most desirable electronic media selections to be placed in the memory of the digital media player. This preference criteria can be specified in a number of ways. The criteria can be based on weighted averages of multiple criterion. The consumer can specify that the 'fresh' or 'new' media selections are to be given first priority. The consumer can specify that their favorite media selections are to be given second priority. The consumer can then specify that 'older' selections are to be given third priority. The consumer can also designate that certain selections (since the total set of playlists may have been automatically generated) should be given 'lowest' priority and only be loaded in memory on a space available basis.

After the selections which meet the top criteria are organized in a sorted order of priority, the next step is to place those selections in memory in the most efficient way that avoids internal fragmentation and wasted memory space. In some cases, this may require that the 'top' criteria set of selections is further limited.

All of these embodiments are useful for the selection and storage of music media files (such as MP3) on an MP3 digital media playback device such as those manufactured by SONICBLUE or CREATIVE LABS.

However all of these embodiments are fully general to all types of digital media playback devices, including electronic book players, portable DVD players, CD music players, etc.

Once the top selections have been made, the system determines if some form of additional secondary storage (such as CD-R, CD-RW, DVD-R or DVD-RW is available to 'burn' (record on CD-R, etc.) copies of the secondary selections on the appropriate media for loading into the digital media player device. The user is then offered the option to have these secondary selections 'burned' into the secondary storage device to carry with the device either as the single default piece of such secondary media or as a set of such media.

If the secondary media selections already exist on secondary storage devices (such as CD-ROM, Music CD, VCD or DVD), then the consumer may be offered the option to select those titles from their library and carry those pieces of media with them.

In another embodiment, the selections are organized to fit into memory in the media player. For the selections that are not able to fit into one of the memory areas in the media player, the remaining selections can be retained in storage on the host computer that is used to download selections to the media player. In a collaborative effort between the media player and the host computer, the host computer can verify that the media selection(s) are available in memory or on local disk storage on the host computer system of the user/consumer. If so, then these selections will only be accessible when the media playback device is connected to the host computer system by a communicative coupling such as USB, 1394 (AKA Firewire), WiFi network or the communicative coupling.

In the event that the media selections are NOT available on the local disk storage, then the media selections might be placed in storage locations that are accessible only on the Internet/Local Network. In this case, the selections are only available when the digital media player is connected to the host computer system and that the host computer is connected to the storage on the Internet or Local Network.

In another embodiment, additional selections can be made available to the media player without consuming storage on the host computer. Assuming that the communicative coupling between the host computer and the media player is of adequate bandwidth to support the 'streaming' of data from a network connection to the host computer to the media playback device at speeds greater than or equal to the playback speeds required of the media playback device, then the additional selections can be held in storage on the network and never reside in storage in the host computer except as cached information in transit to the media player.

All of the options that require some form of memory optimization (i.e., all of the media selections will not fit sequentially into memory) require that a portion of the memory in the media player device be set aside to form an index of the desired playback order of the media selections. This index is relatively tiny since it consists of simple lists of numbers (indexes) of the playlist entries in the order that they are to be played back.

In the simplest case, it is a simple linear list of the selection #s that refers to the order in which the selections are to be played back, regardless of the order of their storage in one or more memories. In more complex and elaborate mechanisms, the list becomes more complex if we track the separate user-defined playlists, the order of the entries in the playlists, the type of memory in which a selection is stored and the index within that storage region where the selection is found. In reality, this may even take on a multi-tiered approach where the index contains information including a unique hash code of the title, artist and length of the selection in order to help create unique keys that are portable across multiple forms of storage.

In one embodiment the consumer/user has chosen to divide the memory in the digital media playback device (perhaps an MP3 player) into different logical devices such that different percentages of memory are allocated to the different formats of media that the consumer/user plays on the device. In this embodiment, the consumer/user may choose to allocate 60% of memory space to News, 0% to Entertainment, 5% to Weather information, 10% to Sports, 10% to Traffic and 15% to Financial information.

In this embodiment the content of the different categories or genres of media are managed automatically by the computer and the digital media playback device. Each of the percentages represent the limits of the amount of memory that can be used to hold the information in the category. These limitations will be smaller than the entire memory space and although memories for digital media playback devices are growing larger and less expensive every year, they represent limitations that typically will limit the amount of content to a few days or at best a few weeks worth of content in the device. This embodiment will then keep the content fresh by applying a sophisticated management method that will insure that the consumer/user always has fresh content available.

In this embodiment, the freshness algorithm is based on three factors. The first factor is the "half-life" aging factor of the content (as assigned by a service or by the consumer). The second factor is the age of the content in the media playback device. The third factor is the threshold level of the content (as assigned by a service or by the consumer).

By dividing a uniform view of memory into logical devices, the content of each of the logical devices can then be managed differently across the different types of storage. This is the paradigm for migration of fresh content. Each of the different groups can be further subdivided into logical devices that represent the percentage of storage allocated to each logical device within the group. The logical device itself spans several groups. All of the content for a category (e.g., News, Entertainment, Weather, Traffic, Sports, Financial) is then managed up and down the hierarchy of groups within the category.

Figure 5:
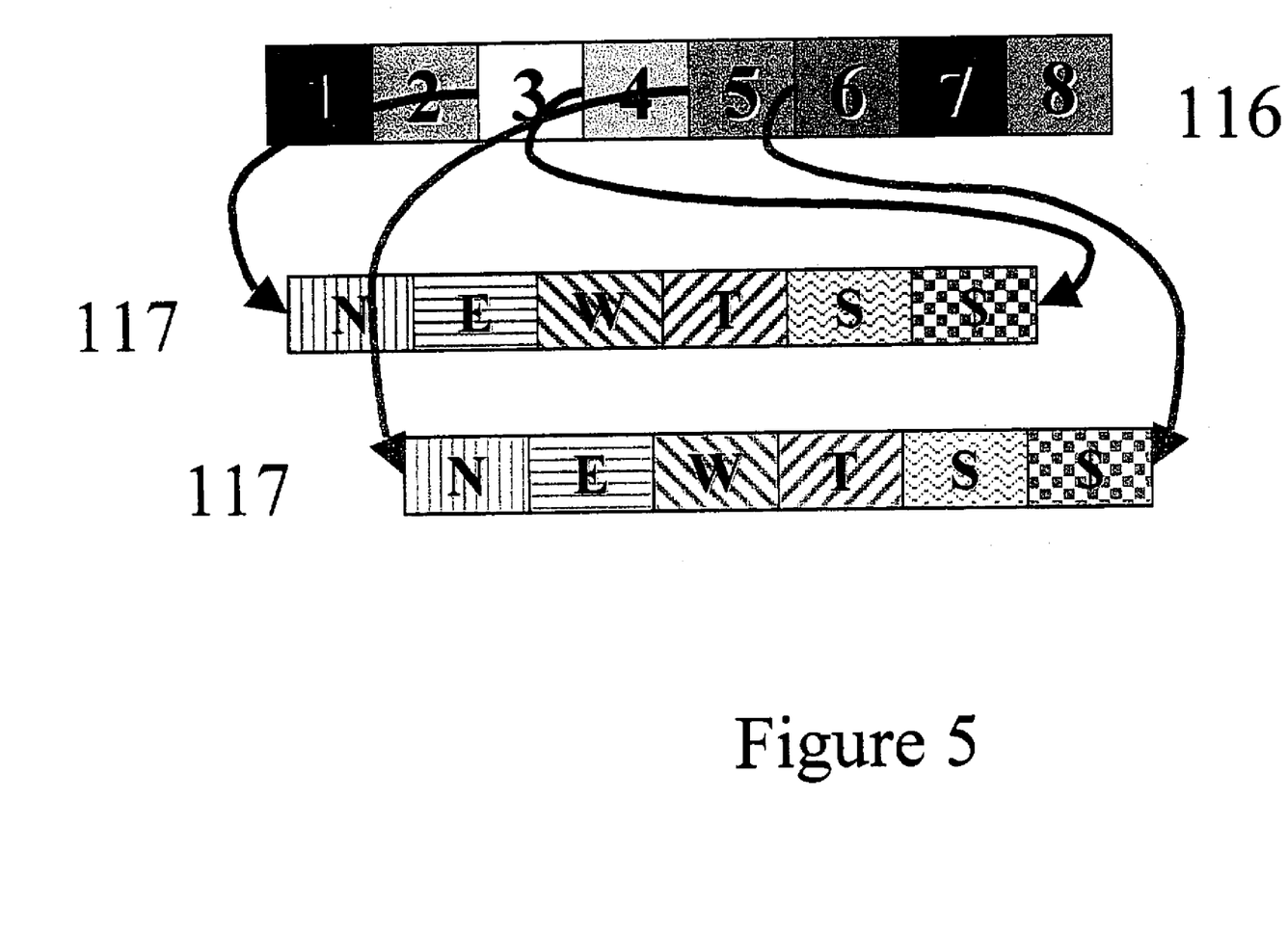
FIG. 5 is a diagram that illustrates how categories (News, Entertainment, Weather, Traffic, Sports and Finances) are accessed from the memory group table.
Figure 6:
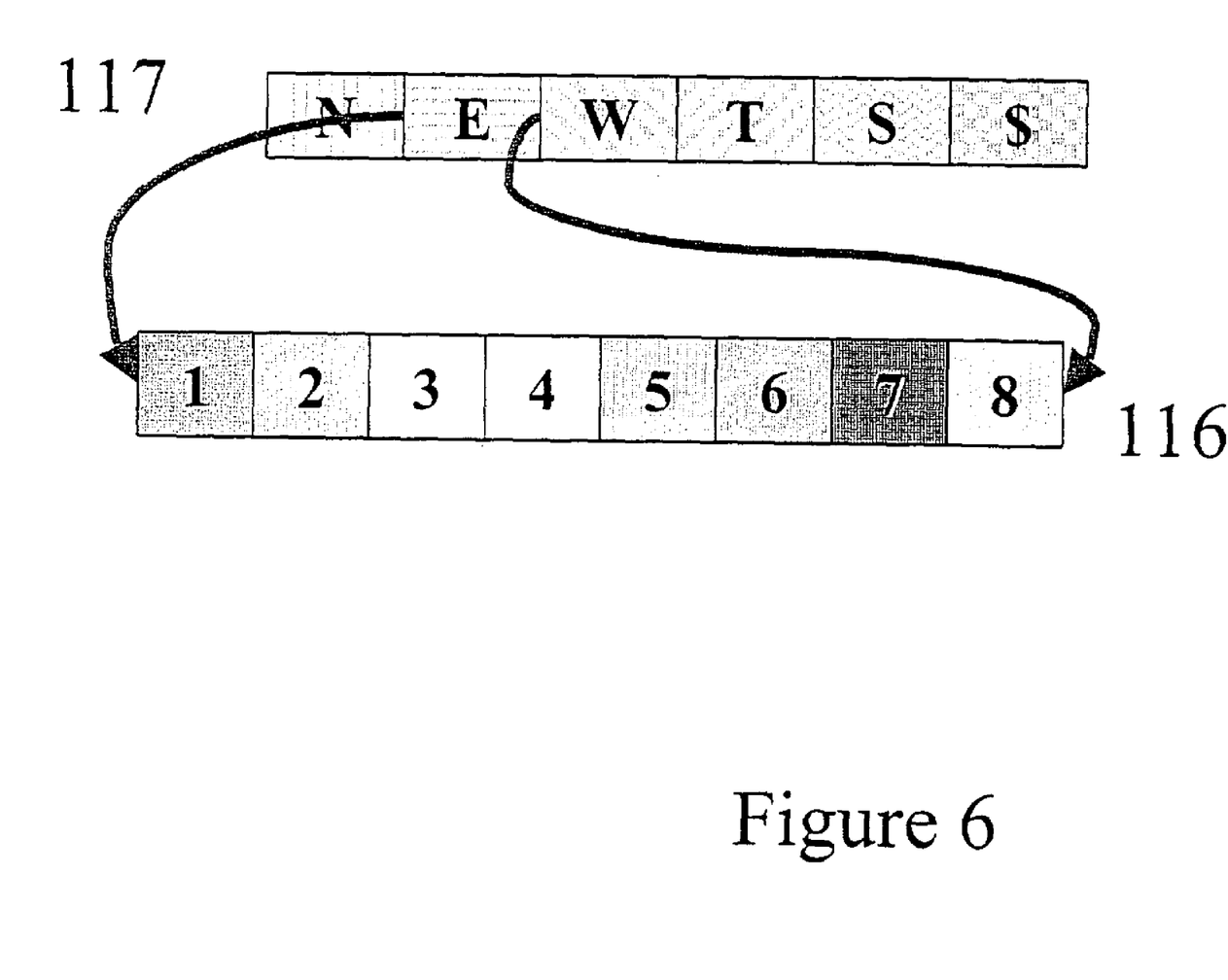
FIG. 6 is a diagram that illustrates how the memory groups are accessed from the category tables.

Referring now to FIG. 5 and FIG. 6, this creates two different views of the storage management. We represent these genre categories with the list 117 that displays the categories in sequential order. We will use the 6 categories listed above and represent them with the symbols (N, E, W, T, S, $) respectively for each category. With this and the numbering that we used above for the groups of storage, FIG. 5 and FIG. 6 represent two different ways of looking at the storage. The first way, illustrated in FIG. 5 is from the Group view where each group contains some allocated percentage devoted to a category. In this FIG. 5, the categories are shown as a breakout of Group #3. In other words, this portion of the content from these categories are stored in Group #3 which FIG. 3 tells us is the internal FLASH memory in the digital media player. Although the categories are displayed as equal in size, they do not have to be the same size. Some of the categories have a size allocation of zero for some groups. For example, it may not be worthwhile to save or hold Traffic reports more than one hour old in Group 3 of storage.

The second way is from the view of Categories as shown in FIG. 6. Each Category of programming is actually spread across different groups of storage. The two views are actually isomorphic, but in order to be easy to use and implement, both representations must exist simultaneously and be built in such a way that the representations of both views are automatically maintained.

Figure 7:
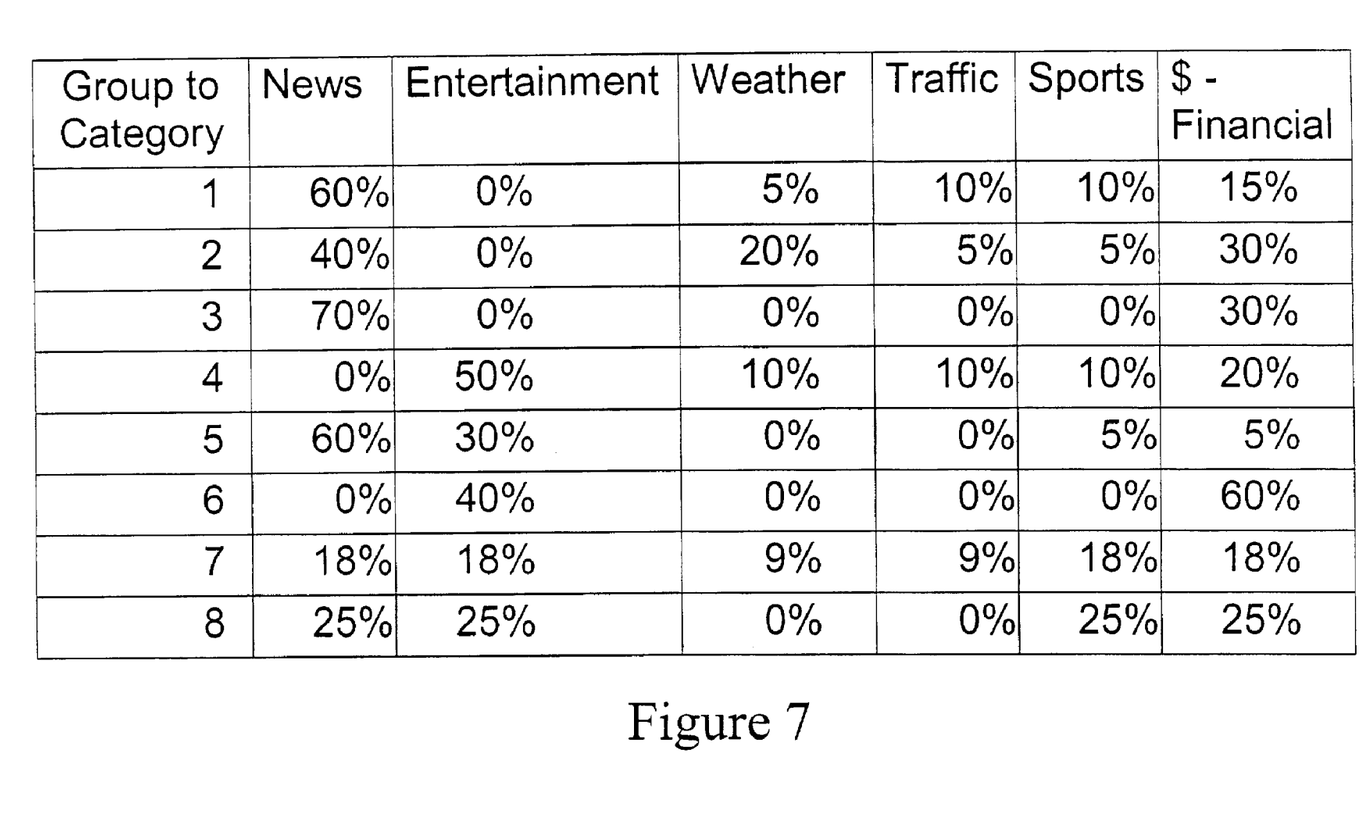
FIG. 7 is a table that illustrates how the space in physical memory groups can have their memory partitioned among the logical memory devices.

The table in FIG. 7 illustrates some different ways that the data presented in the diagrams might be allocated by percentage in the different storage groups.

What is claimed is:

1. A method of managing separate storage regions in a digital media playback device, the method comprising:
   providing a prioritization of media selections based on user criteria;
   providing an organization of media selections based on user criteria for maximum amounts of memory devoted to different types or categories of digital media;
   providing an organization of media selections to optimize memory usage in separate storage regions;
   providing a mechanism to automatically index portable rotating media selected from one of music CD, CD-ROM, CD-R, CD-RW, VCD, DVD-R and DVD-RW; and
   providing a mechanism to automatically create portable rotating media selected from one of CD-R, CD-RW, VCD, DVD-R and DVD-RW.

2. An apparatus of managing separate storage regions in a digital media playback device, the apparatus comprising:
   a mechanism for prioritizing media selections based on user criteria;
   a mechanism for organizing media selections based on user criteria for maximum amounts of memory devoted to different types or categories of digital media;
   a mechanism for organizing media selections to optimize memory usage in separate storage regions;
   a mechanism to automatically index portable rotating media selected from one of music CD, CD-ROM, CD-R, CD-RW, VCD, DVD-R and DVD-RW; and
   a mechanism to automatically create portable rotating media selected from one of CD-R, CD-RW, VCD, DVD-R and DVD-RW.

3. A system of managing separate storage regions in a digital media playback device, the system comprising:
   means for prioritizing media selections based on user criteria;
   means for organizing media selections based on user criteria for maximum amounts of memory devoted to different types or categories of digital media;
   means for organizing media selections to optimize memory usage in separate storage regions;
   means to automatically index portable rotating media selected from one of music CD, CD-ROM, CD-R, CD-RW, VCD, DVD-R and DVD-RW; and
   means to automatically create portable rotating media selected from one of CD-R, CD-RW, VCD, DVD-R and DVD-RW.

* * * * *